US008045013B2

(12) United States Patent
Abe

(10) Patent No.: US 8,045,013 B2
(45) Date of Patent: Oct. 25, 2011

(54) IMAGING DEVICE, IMAGING METHOD AND COMPUTER PROGRAM

(75) Inventor: Hiroshi Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 479 days.

(21) Appl. No.: 12/100,516

(22) Filed: Apr. 10, 2008

(65) Prior Publication Data

US 2008/0309796 A1  Dec. 18, 2008

(30) Foreign Application Priority Data

Jun. 13, 2007  (JP) ................................. 2007-156068

(51) Int. Cl.
*H04N 5/228* (2006.01)

(52) U.S. Cl. .................................................. 348/222.1

(58) Field of Classification Search ............... 348/222.1, 348/231.99; 382/118, 128
See application file for complete search history.

(56) References Cited

U.S. PATENT DOCUMENTS

| 7,319,780 B2 * | 1/2008 | Fedorovskaya et al. ...... 382/128 |
| 2004/0218916 A1 | 11/2004 | Yamaguchi et al. |
| 2005/0286762 A1 * | 12/2005 | Park ............................. 382/166 |
| 2007/0195174 A1 * | 8/2007 | Oren ........................... 348/222.1 |

FOREIGN PATENT DOCUMENTS

| JP | 9-171560 | 6/1997 |
| JP | 2000-347278 | 12/2000 |
| JP | 2003-271933 | 9/2003 |
| JP | 2004-294498 | 10/2004 |
| JP | 2006-201531 | 8/2006 |
| JP | 2006-215571 | 8/2006 |
| JP | 2006-237803 | 9/2006 |
| JP | 2007-67560 | 3/2007 |

OTHER PUBLICATIONS

U.S. Appl. No. 12/107,314, filed Apr. 22, 2008, Abe.
U.S. Appl. No. 12/123,201, filed May 19, 2008, Suzuki, et al.
U.S. Appl. No. 12/126,401, filed May 23, 2008, Abe.

* cited by examiner

*Primary Examiner* — David Ometz
*Assistant Examiner* — Akshay Trehan
(74) *Attorney, Agent, or Firm* — Oblon, Spivak, McClelland, Maier & Neustadt, L.L.P.

(57) ABSTRACT

An imaging device includes an image input unit for inputting an image of a subject, an image signal processing unit for processing the input image, an image recording unit for recording the input image on a recording medium, a smiling degree detection unit for detecting a smile level of the subject contained in the input image processed by the image signal processing unit, a detection threshold level setting unit for setting a smiling face detection threshold level at which a determination of whether the subject is smiling is performed based on the smile level detected by the smiling degree detection unit, and a photographing control unit for controlling a photographing operation in response to the smiling face detection threshold level being reached by the smile level of the subject detected by the smiling degree detection unit.

23 Claims, 8 Drawing Sheets

IMAGING DEVICE, IMAGING METHOD AND COMPUTER PROGRAM

CROSS REFERENCES TO RELATED APPLICATIONS

The present invention contains subject matter related to Japanese Patent Application JP 2007-156068 filed in the Japanese Patent Office on Jun. 13, 2007, the entire contents of which are incorporated herein by reference.

BACKGROUND OF THE INVENTION

1. Field of the Invention

The present invention relates to an imaging device, an imaging method and a computer program for capturing an image containing an image of a person as a subject. In particular, the present invention relates to an imaging device, an imaging method and a computer program for performing automatic camera work in response to recognition of a particular pattern from a subject represented in the image.

The present invention further relates to an imaging device, an imaging method and a computer program for automatically determining a photographing timing in response to a recognition of a smiling face image of the subject contained in the image. In particular, the present invention relates to an imaging device, an imaging method and a computer program for determining a photographing timing by detecting a smiling face of an appropriate subject based on a smile level regardless of difference, such as difference in person, sex, race, and culture.

2. Description of the Related Art

Cameras have a long history serving as means for recording visual information. Currently, digital cameras are replacing silver-salt cameras using a photographing plate or film and are in widespread use. The digital camera captures an image with a solid-state imaging element such as a charge-coupled device (CCD) or a complementary metal-oxide semiconductor (CMOS) device and analog-to-digital converts the image. The digital camera stores a digital encoded image onto a memory and performs an image processing operation and an image management on the image with a computer. Such a digital camera is free from the limitation of service life of films.

The silver salt camera and the digital camera are substantially identical to each other in basic camera work. The digital camera incorporates advanced automatic technique in camera work. Even an inexperienced user is unlikely to fail to photograph.

The digital camera has an auto focus (AF) function, an auto exposure (AE) function, and an image stabilization function. The digital camera has an advantage that the AF function and the AE function are performed not only by an optical system but also in digital processing. Furthermore, the digital camera performs appropriate color reproduction by image quality adjusting a captured image in digital processing. The digital processing includes multiplying the captured image by a white balance gain in an auto white balance function.

The auto focus and the image quality adjustment are performed with the camera focusing on at least one subject present within an image frame. Previously, the user manually sets an important subject. Currently, the digital camera incorporates photographing techniques of face detection. For example, the camera detects a face of a person from a captured image and automatically focuses on the detected face or automatically adjusts image quality with respect to the face.

Japanese Unexamined Patent Application Publication No. 2003-271933 discloses a technique of detecting a face from a captured image signal. In accordance with the disclosure, an average face image serves as a template to be checked against an input image signal for matching. Such a technique is widely known. A face slant in the captured image is difficult to detect. In such a case, an angle of the face is detected, the image of the face is rotated in accordance with the detected angle value and then the matching process is performed. Japanese Unexamined Patent Application Publication No. 9-171560 discloses a technique of detecting an angle of a face. In accordance with disclosure, the centerline of the face is detected and the likeliness of the centerline is calculated based on left-right symmetry of the face. The angle of the centerline having a high likeliness is output as the angle of the face.

Auto shutter for determining a photograph timing based on a recognition of a particular pattern of a subject image such as a smiling face has been recently studied and developed.

Japanese Unexamined Patent Application Publication Nos. 2000-347278, 2004-294498 and 2006-237803 have disclosed cameras that output a photographing timing signal when a predetermined photographing condition is satisfied. Such a camera determines whether a main subject satisfies the predetermined photographing condition within an area of interest contained in the main subject to be photographed. The areas of interest may include a shape and color of the eyes and the mouth of a person if the person is photographed and feather of a bird if the bird is photographed.

Factors serving as specific photographing timing may be conditions to make a person look good in photo, such as "remaining unblinking," "looking at the camera," and "smiling." In related art, retouching techniques have been long available to modify a photo of a person to make the person look good. However, it is difficult to modify a photo of a person blinking to a photo of the person remaining unblinking or to modify a photo of a person with a smiling face to a photo of the person with an unsmiling face. This is one reason why a smiling face is one photographing condition.

The photographing condition of "smiling" is determined based on image information related to an area of the white of the eyes in the subject, the horizontal length of the mouth of the subject, and an area of white portions in the mouth. If a plurality of subjects are shown in an image frame input via an imaging element, it is not known which one of the subjects is to be used to determine the photographing timing. The area of the white of the eyes in the subject, the horizontal length of the mouth of the subject, and the area of white portions in the mouth are different from person to person. These factors are also different depending on differences in sex, age, race, culture, etc. Smiling face detection performed with a uniform threshold applied to such varied factors is problematic.

For example, a smiling face may be more easily detected from one person than other persons even if he or she does not actually smile. In such a case, unnecessary photographing operations may be triggered, leading to an accumulation of useless images. Conversely, photographing operations may be triggered less from one particular person than other persons even if he or she broadly smiles. In such a case, the person as a subject may be forced to attempt to smile with the eyes and mouth opened and teeth exposed throughout a caption period.

Cameras notifying one of a user and a subject of a photographing timing are well-known. The subject may stop trying to smile in response to a generation of an alarm sound or a flashing of LED indicating that the caption operation has been performed. However, there is no means to notify the subject of a smile level of the subject (i.e., relating to how the smiling face of the subject is evaluated). If the caption is not conveyed to the subject, the subject is forced to smile ready for a photographing timing without knowing whether the smile level is insufficient or whether illumination or other photographing conditions are insufficient.

SUMMARY OF THE INVENTION

It is thus desirable to provide an excellent imaging device, an excellent imaging method and a computer program for performing automated camera work in response to a recognition of a particular pattern from a subject contained in a captured image.

It is also desirable to provide an excellent imaging device, an excellent imaging method and a computer program for determining automatically an appropriate photographing timing in response to the recognition of a smiling face from a subject contained in the captured image.

It is also desirable to provide an excellent imaging device, an excellent imaging method and a computer program for determining a photographing timing by detecting a smiling face of an appropriate subject based on a smile level regardless of difference, such as difference in person, sex, race, culture, etc.

In accordance with one embodiment of the present invention, an imaging device, includes an image input unit for inputting an image of a subject, an image signal processing unit for processing the input image, an image recording unit for recording the input image on a recording medium, a smiling degree detection unit for detecting a smile level of the subject contained in the input image processed by the image signal processing unit, a detection threshold level setting unit for setting a smiling face detection threshold level at which a determination of whether the subject is smiling is performed based on the smile level detected by the smiling degree detection unit, and a photographing control unit for controlling a photographing operation in response to the smiling face detection threshold level being reached by the smile level of the subject detected by the smiling degree detection unit.

The imaging devices such as digital cameras are in widespread use, and techniques for automating camera work have also been developed. Research and development have been performed on auto shutter function of the automated camera work. The auto shutter function determines photographing timing using a particular pattern in an image of a smiling person (subject). Factors serving as specific photographing timing may be conditions to make a person look good in photo, such as "remaining unblinking," "looking at the camera," and "smiling."

The generation of an alarm sound and the flashing or blinking of a lamp are widely known notification functions for notifying the subject of the photographing timing in the photographing operation of the camera.

There is no means to notify one of the user and the subject of a smile level of the subject (i.e., relating to how the smiling face of the subject is evaluated). Depending on personal difference, the photographing operation may be triggered less because smiling face is detected less, or may be triggered more because smiling face is detected more. In the latter case, many unnecessary images are photographed.

In the imaging device of one embodiment of the present invention, the smiling degree detection unit detects the smile level of the subject contained in the input image. The photographing control unit controls the photographing operation in response to the smiling face detection threshold level being reached by the detected smile level of the subject. The imaging device further includes the detection threshold level setting unit for setting the smiling face detection threshold level at which a determination of whether the subject is smiling is performed based on the smile level. The detection threshold level setting unit can set the smiling face detection threshold level to an appropriate level regardless of difference in person, sex, age, race, culture, etc. The smiling face detection threshold level serving as a photographing condition is set by the user.

The imaging device of one embodiment of the present invention may further include a notification unit that not only performs a caption operation on condition that a smiling pattern detected from the subject being photographed satisfies a predetermined photographing condition but also notifies the user of information relating to the smile level of the subject detected by the smiling degree detection unit.

One of the user and the subject can know the status of the current smiling face of the subject. The detection threshold level setting unit modifies the smiling face detection threshold level in response to an instruction input from the user via an operation unit typically available in the imaging device. The smiling face detection threshold level is not sufficient depending on personal difference. For example, an auto photographing operation may be easily triggered even though the subject does not smile, or the auto photographing operation may remain untriggered even though the subject broadly smiles. In such a case, one of the user and the subject modifies the smiling face detection threshold level adaptively.

The imaging device can thus avoid being stuck to a standby state in which the imaging device is ready to detect a smiling face with an angle of view set to a subject but remains still untriggered with no face detected. The imaging device also avoids an easily triggered state in which a smiling face is detected even when a subject does not smile much.

The notification unit may display information relating to the smile level of the subject in an on-screen display fashion on a through image. The notification unit may display, in an on-screen display fashion, the information relating to the smile level together with the smiling face detection threshold level set by the detection threshold level setting unit.

The smile level and the smiling face detection threshold level may be displayed using a slider meter known in the related art. The slider meter is numerically graduated with values ranging from a 0% level to a 100% level along a line. For example, a range of a currently detected smile level is represented by a solid line or highlighted. The smiling face detection threshold level is represented by a slide bar movable along the slider meter. The user can modify the smiling face detection threshold level by moving the slide bar.

The smiling face detection threshold level may be automatically adjusted in the information processing system of one embodiment of the present invention instead of being adjusted in response to an instruction from one of the user and the subject. For example, the imaging device may automatically adjust the smiling face detection threshold level in response to a frequency of detection of smiling face form the detected face of the subject in the input image.

More specifically, the detection threshold level setting unit may lower the smiling face detection threshold level in response to a time elapse for which no smiling face has been detected from the detected face of the subject. The detection threshold level setting unit maintains a lower limit level once reached by the smiling face detection threshold level. The detection threshold level setting unit maintains a smiling face detection threshold level at which a smiling face is once detected from the detected face of the subject. The detection threshold level setting unit restores the smiling face detection threshold level to an original value thereof when the face of the subject is no longer detected from the input image. When a face of a new subject is detected, the same process is to be performed.

The imaging device may further include a display unit for displaying the input image processed by the image signal processing unit, a resolution conversion unit for converting the input image processed by the image signal processing unit and an image compression unit for compressing the image, resolution converted by the resolution conversion unit, in accordance with the photographing mode. The image recording unit records, on the recording medium, image information into which the image is compressed. The smiling degree detection unit may detect a smile pattern of the subject in the image, the image being resolution converted as a through image rather than an image to be captured.

In accordance with one embodiment of the present invention, a computer-readable program for causing a computer to perform a photographing operation on an input image of a subject, includes steps of processing the input image, detecting a smile level of the subject contained in the processed input image, setting a smiling face detection threshold level at which a determination of whether the subject is smiling is performed based on the detected smile level, and recording the input image onto a predetermined recording medium in response to the smiling face detection threshold level being reached by the detected smile level of the subject.

The computer program is described in a computer readable format to be executed on a computer. By installing the computer program on the computer, the computer can work in the same manner as the above-described imaging device.

In accordance with embodiments of the present invention, an auto camera work process is performed based on the recognition of a particular pattern from the subject contained in the image.

In accordance with embodiments of the present invention, a photographing timing is automatically determined by detecting a smiling face of an appropriate subject based on a smile level of the subject contained in the image.

In accordance with embodiments of the present invention, a photographing timing is automatically determined by detecting a smiling face in accordance with an appropriate smiling face detection threshold level regardless of difference, such as difference in person, sex, race, culture, etc.

With the imaging device of in accordance with one embodiment of the present invention, one of the user and the subject can know the current status of the smiling face of the subject. For example, an auto photographing operation may be easily triggered even though the subject does not smile, or the auto photographing operation may remain untriggered even though the subject broadly smiles. In such a case, one of the user and the subject modifies the smiling face detection threshold level adaptively.

The imaging device of one embodiment of the present invention can thus avoid being stuck to a standby state in which the imaging device is ready to detect a smiling face with an angle of view set to a subject but remains still untriggered with no face detected. The imaging device also avoids an easily triggered state in which a smiling face is detected even when the subject does not smile much.

These and other objects, features and advantages will become apparent from the following description of the embodiments of the present invention with reference to the accompanying drawings.

DESCRIPTION OF THE PREFERRED EMBODIMENTS

The embodiments of the present invention are described below with reference to the drawings.

Figure 1:
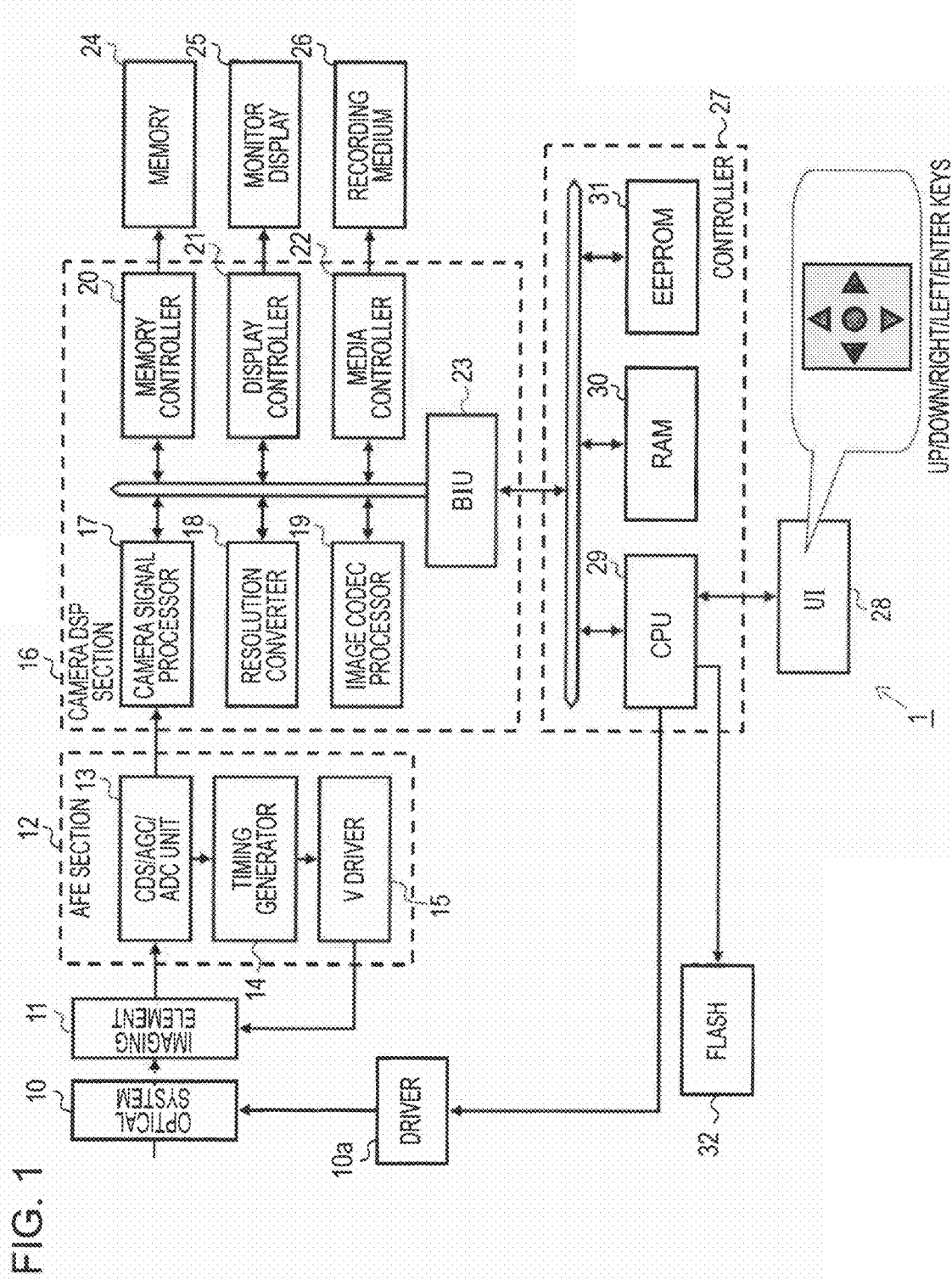
FIG. 1 diagrammatically illustrates a hardware structure of a digital still camera in accordance with one embodiment of the present invention.

FIG. 1 illustrates a hardware structure of a digital still camera 1 in accordance with one embodiment of the present invention. The digital still camera 1 includes an imaging element 11, an analog front end (AFE) section 12 and a camera digital signal processor (DSP) section 16. The digital still camera 1 digital processes an image input through an optical system 10 and records the processed image.

The optical system 10 includes a lens for collecting a light beam from a subject on the imaging element 11, a drive mechanism for moving the lens for focusing and zooming, a shutter mechanism for allowing the light beam from the subject to be incident on the imaging element 11 for a predetermined duration of time in response to a shutter release operation, and an iris mechanism for limiting the light beam from the subject in terms of a direction and a cross-sectional area of the light beam (these mechanisms are not shown). The driver 10a controls each mechanism in the optical system 10 in response to a control signal from a central processing unit (CPU) 29 to be discussed later.

The imaging element 11 includes a matrix of pixels, each having a photoelectric conversion effect (such as one of a charge-coupled device (CCD) and a complementary metal oxide semiconductor (CMOS)). The imaging element 11 converts the incident light beam from the subject into an electrical signal. The imaging element 11 includes on a light receiving portion thereof a plate having a green (G) segment checker board pattern with RB segment coded. A signal charge responsive to an amount of incident light having passed through each color filter is accumulated in each pixel and color of each incident light beam at each pixel position is reproduced from the tri-color signal charges read from the pixels. An analog image signal output from the imaging element 11 is each of the RGB tri-color signals. Alternatively, the analog image signal may be each of complementary color signals.

The analog front end section 12 is an integrated circuit (IC) chip and includes a CDS/AGC/ADC unit 13, a timing generator 14 and a V driver 15.

After reducing low-level noise in the image signal from the imaging element 11, the CDS/AGC/ADC unit 13 performs correlated double sampling (CDS) and sample holds the image signal, performs an automatic gain control (AGC) process on the image signal, and then analog-to-digital converts the image signal into a digital image signal.

The timing generator 14 generates a timing pulse signal driving the imaging element 11. In response to the timing pulse signal, the V driver 15 outputs a drive signal for outputting charges from pixels in the imaging element 11 on a line-by-line basis in a vertical direction.

The camera DSP section 16 has a single-chip structure and includes a camera signal processor 17, a resolution converter 18, an image codec processor 19, a memory controller 20, a display controller 21 and a media controller 22.

The camera signal processor 17 performs a pre-process including pixel defect correction, digital clamp, and digital gain control on the image signal from the analog front end section 12. The camera signal processor 17 performs white-balance gain control process on the pre-processed image signal with AWB function while also performing an image quality correction process including sharpness, color saturation, contrast adjustments on the image signal. An appropriate color state is thus reproduced. The camera signal processor 17 generates RGB image signals through a demosaic process. The image quality correction process may include flash level and red eye reduction adjustments. The camera signal processor 17 further performs a gamma correction on the RGB image signals, thereby converting image information into a signal in gradations appropriate for monitoring, printout, or video recording. The camera signal processor 17 detects luminance information from an output image signal from the analog front end section 12. More specifically, the camera signal processor 17 performs histogram detection to detect a histogram on a per predetermined range basis and color detection to detect color information on a per predetermined range basis. The histogram detection results and the color detection results are output to a controller 27 to be discussed later.

The resolution converter 18 converts a size of the image. The image codec processor 19 color-space converts the RGB image signals into a luminance signal and color difference signals (Y, Cr and Cb) and also performs compression encoding process including joint picture experts group (JPEG) compression and moving picture experts group (MPEG) compression.

The memory controller 20 controls an access operation to read and write data of captured image information onto a memory 24 including a synchronous DRAM (SDRAM).

A monitor display 25 includes a flat display panel of liquid-crystal display or other type. The display controller 21 controls the monitor display 25. The display controller 21 converts image data (through image) output from the camera signal processor 17 and image data stored on the memory 24 into a signal to be displayed on the monitor display 25 and then outputs the signal to the monitor display 25.

The monitor display 25 further displays as an on-screen display (OSD) a menu screen and a variety of setting screens and a variety of warning information in response to a request from the controller 27. In accordance with one embodiment of the present invention, setting screens displayed in an OSD display fashion on the monitor display 25 include a screen for detection results of a smiling face pattern and a screen for setting the smiling face detection threshold level as a photographing condition.

The media controller 22 has a slot receiving a removable recording medium 26 such as a Memory Stick (Registered Trademark) and reads and writes data on the recording medium 26. For example, the media controller 22 records a captured image file stored on the memory 24 onto the recording medium 26.

The camera DSP section 16 is connected to the controller 27 via a bus interface unit (BIU) 23. The controller 27 includes a user interface (UI) 28, a CPU 29 generally controlling operation of the digital still camera 1 in response to a user operation, a random-access memory (RAM) 30 serving as a main memory for the CPU 29, and an electrically erasable and programmable read-only memory (EEPROM) 31 storing program code and device information in a non-volatile fashion.

The CPU 29 detects a smiling face of a subject using an image, resolution converted by the resolution converter 18. The CPU 29 performs a GUI process for displaying an OSD on the monitor display 25. In accordance with one embodiment of the present invention, the GUI process includes displaying the smile level of the subject and the currently set smiling face detection threshold level and a setting screen for switching such levels.

The UI 28 has an operation function with which the user can input an instruction and an output function as a loudspeaker and a light-emitting diode (LED) lamp. To perform the operation function, the UI 28 includes a shutter release button and keys and dials for a variety of settings including flash on and off. A control signal in response to a user operation on these controls is input to the CPU 29. In accordance with one embodiment of the present invention, the UI 28 includes five operation (cross) keys, i.e., up, down, left and right keys and a center enter key surrounded by those four keys.

In the output function, the UI 28 feeds back, to the user, information related to camera work, using an alarm audio sound and lighting or blinking of the LED.

A flash section 32 flashes a light in response to flash control information from the controller 27.

In the digital still camera 1, signals successively received and then photoelectrically converted by the imaging element 11 are fed to the analog front end section 12. After being CDS processed and AFE processed, the resulting signal is analog-to-digital converted. The camera signal processor 17 image-quality corrects the digital image signal supplied from the analog front end section 12 and then converts the image-quality corrected signal into a luminance (Y) signal, and difference (R-Y and B-Y) signals.

The display controller 21 converts the image data output from the camera signal processor 17 into an image signal. The monitor display 25 then display the through image responsive to the image signal.

Figure 2:
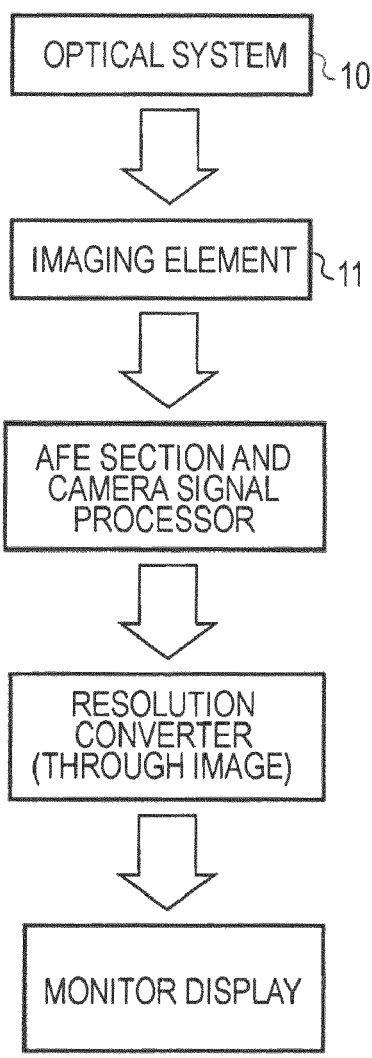
FIG. 2 diagrammatically illustrates a data flow of a camera image as a through image displayed on a monitor display.

FIG. 2 illustrates a data flow of a camera image displayed on the monitor display 25.

Information relating to the subject is converted into a digital signal through the optical system 10, the imaging element 11 and the analog front end section 12 and the resulting digital signal is then supplied to the camera DSP section 16. The camera DSP section 16 performs an image signal process, thereby correcting brightness and color. The camera DSP section 16 further performs resolution conversion on the image. The resulting image is then displayed on the monitor display 25. The CPU 29 in the controller 27 controls such an image output process by performing a predetermined program code. The image output control process is actually divided into small job segments. Since such job segments are not closely related to the present invention, the discussion thereof is omitted here.

When a user operation instruction is input to the controller 27 via the UI 28 to instruct the controller 27 to record an image, image data from the camera signal processor 17 is supplied to the image codec processor 19. The image codec processor 19 performs a predetermined compression encoding process on the image data, and the compression encoded image data is stored onto the memory 24 via the memory controller 20 or recorded onto the recording medium 26 via the media controller 22. When a still image is recorded, the camera signal processor 17 supplies the image data of one frame to the image codec processor 19. When a moving image is recorded, processed image data is continuously supplied to the image codec processor 19.

Figure 3:
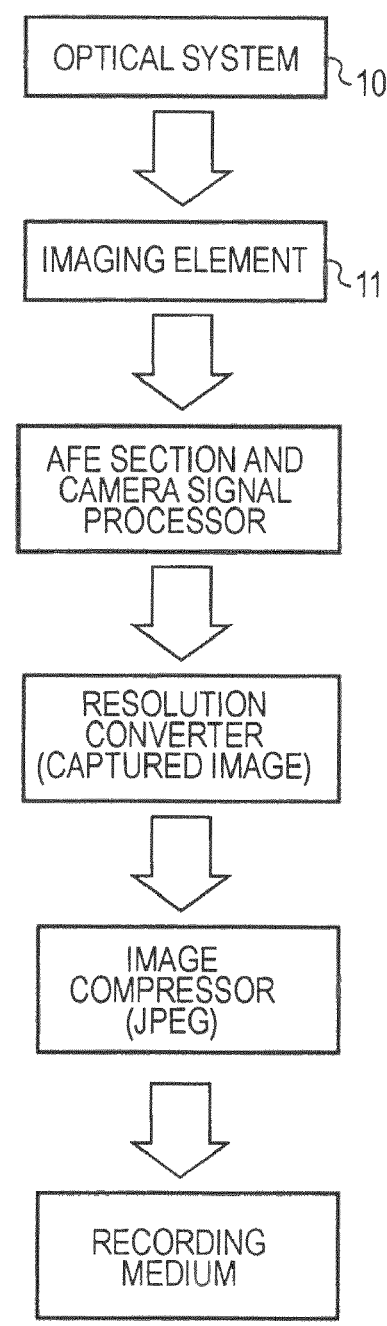
FIG. 3 diagrammatically illustrates a data flow in which the digital still camera performs a photographing operation.
Figure 4:
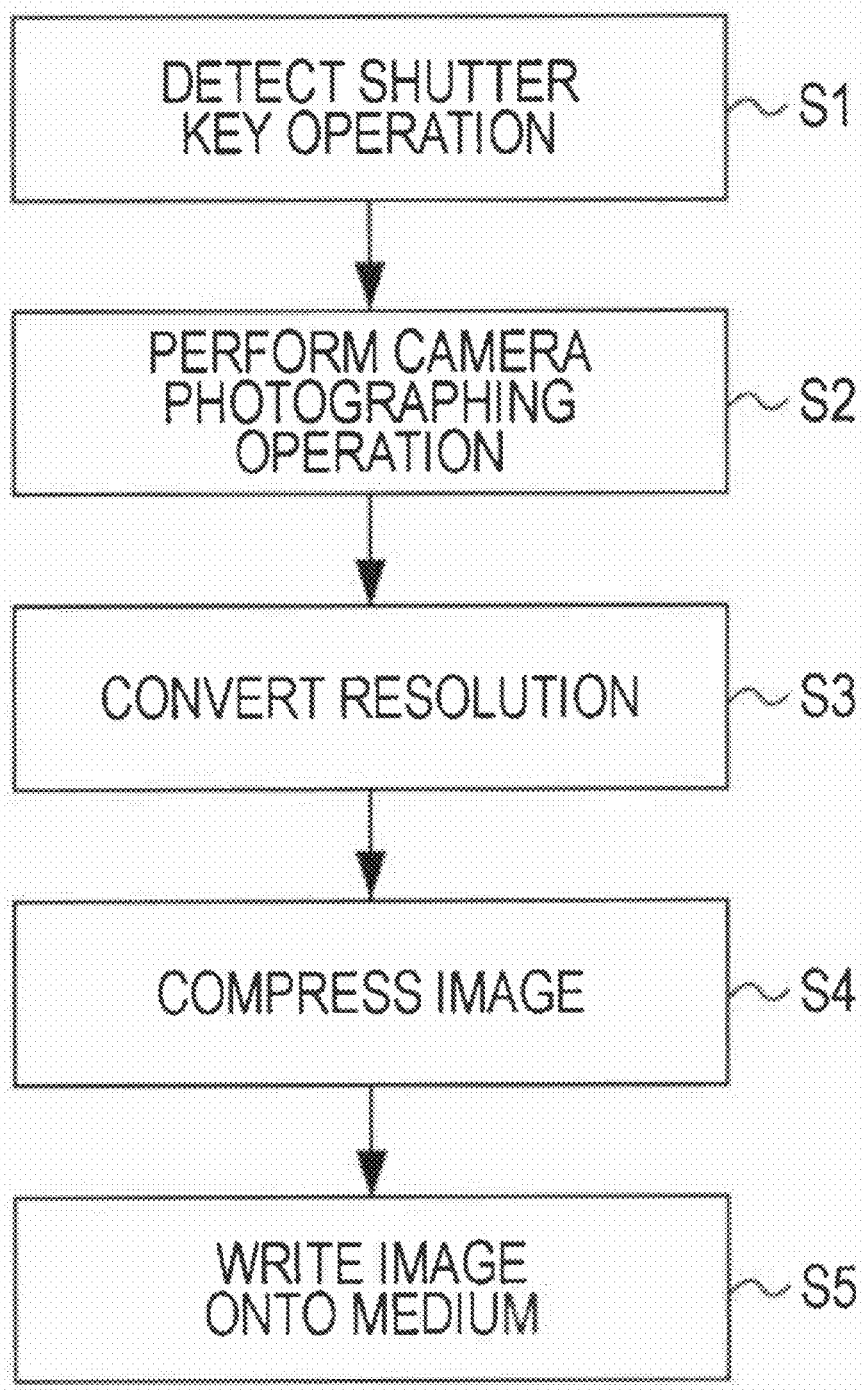
FIG. 4 is a flowchart illustrating a process of the digital still camera performing the photographing operation.

FIG. 3 diagrammatically illustrates a data flow of a photographing operation of the digital still camera 1. FIG. 4 is a flowchart of the photographing operation of the digital still camera 1.

In the same way as described with reference to FIG. 2, the subject is displayed on the monitor display 25. When the user presses the shutter key on the UI 28 (step S1), the UI 28 detects the pressed key and sends a signal of key information to the CPU 29. In response, the CPU 29 outputs a control signal to the driver 10*a* and performs the photographing operation (step S2). The AF process and the AE process are also performed together.

When a command to perform the photographing operation is issued via the driver 10*a*, information relating to the subject is converted into a digital signal via the optical system 10, the imaging element 11 and the analog front end section 12. The resulting digital signal is then supplied to the camera DSP section 16. The camera DSP section 16 performs the image signal process, thereby correcting brightness and color on the image signal. The camera DSP section 16 also performs the resolution conversion on the image signal, thereby converting the image signal into an image size appropriate for a photographing mode (step S3). The image codec processor 19 performs the JPEG compression process on the image (step S4). The JPEG compressed image is then recorded on the recording medium 26 via the media controller 22 (step S5).

The digital still camera 1 of one embodiment of the present invention performs the auto shutter function. With the auto shutter function, the digital still camera 1 determines the photographing timing based on a particular pattern recognized from the image of a smiling person (subject). The smiling face recognition may be performed by the CPU 29 that performs an image recognition processing program. The smiling face recognition may be performed by an image recognition processing engine (not shown) that is incorporated in the controller 27. The smiling face recognition technique may be any one disclosed in the related art and the discussion thereof is omitted.

In the photographing operation, the digital still camera 1 may notify the subject of the photographing timing using the output function of the UI 28. More specifically, the digital still camera 1 generates an alarm sound or lights or blinks the lamp to notify the subject of the photographing timing.

If a plurality of persons smile to the same degree, the degrees of smiles of the persons determined within the image using a smiling face recognition technique become different depending on difference in person, sex, age, race, and even culture. The smile level of the subject obtained through image processing is compared with a uniform smiling face detection threshold level to determine whether the subject smiles or not, and the auto photographing operation is triggered in response to comparison results. With such an arrangement, an auto photographing operation may be easily triggered even though the subject does not smile, or the auto photographing operation may remain untriggered even though the subject broadly smiles.

The digital still camera 1 of one embodiment of the present invention notifies one of the user and the subject of a smile level of the subject currently photographed (i.e., relating to how the smiling face of the subject is evaluated). The smiling face detection threshold level serving as the photographing condition is manually set by the user.

One of the user and the subject can know the current status of the smiling face of the subject captured by the camera. An auto photographing operation may be easily triggered even though the subject does not smile, or the auto photographing operation may remain untriggered even though the subject broadly smiles. If the smiling face detection threshold level is determined to be inappropriate in view of personal difference, one of the user and the subject may correct the smiling face detection threshold level adaptively, thereby covering personal difference from person to person.

Figure 5:
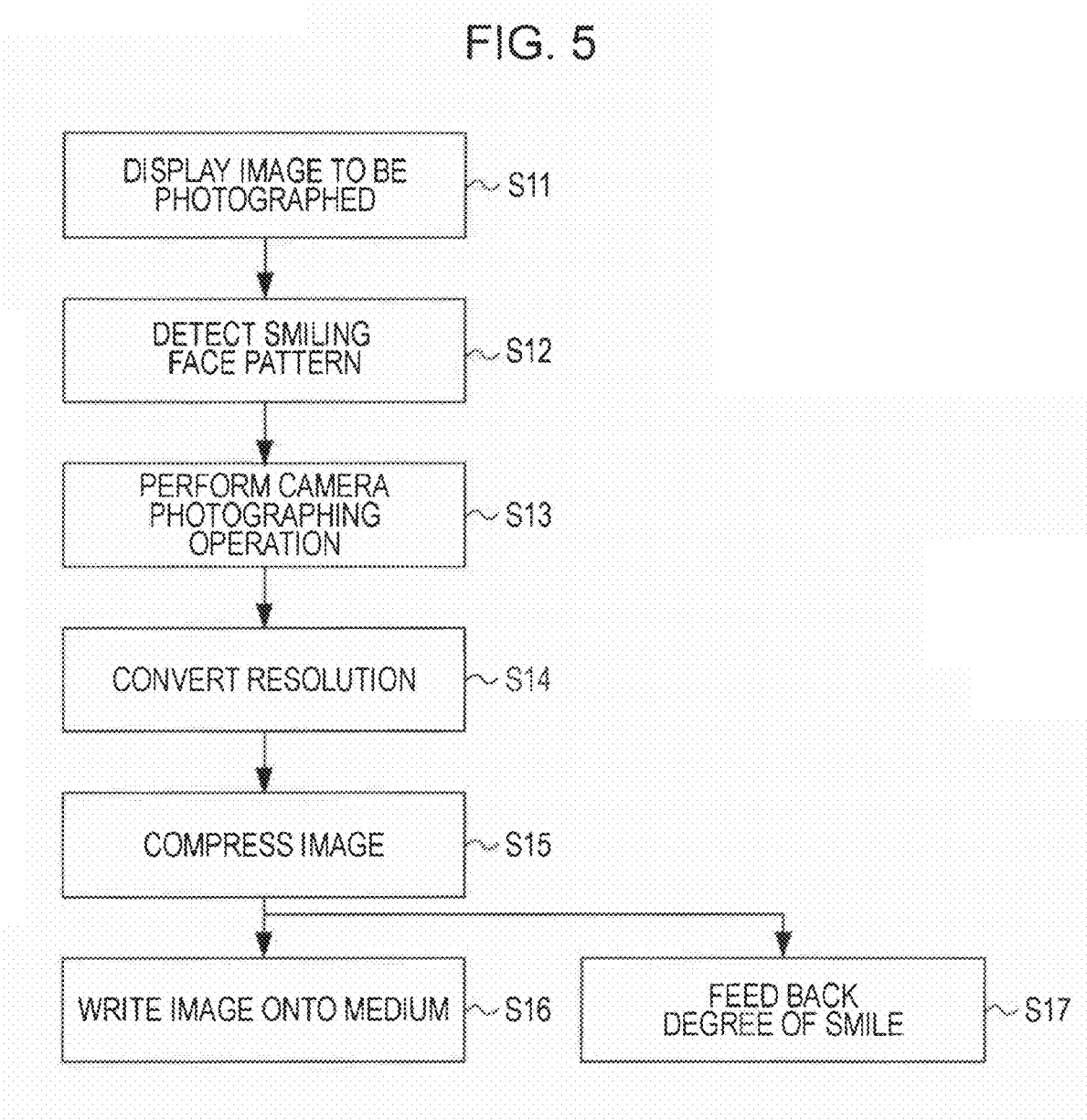
FIG. 5 is a flowchart illustrating a process of the digital still camera that performs an auto photographing operation based on smiling face detection while notifying a person as a subject of a photographing timing.

FIG. 5 is a flowchart of the auto photographing operation performed in response to the detected smiling face by the digital still camera 1.

In accordance with the data flow of FIG. 2, the camera image input via the optical system 10 is displayed on the monitor display 25 (step S11).

The image then displayed is also supplied to the controller 27. The CPU 29 (an image recognition engine (not shown)) performing a predetermined image recognition processing program detects the smile level of the subject (step S12).

When the user presses the shutter key on the UI 28, the camera photographing operation starts (step S13). More specifically, the CPU 29 issues via the driver 10*a* an instruction to perform the photographing operation. Information of the subject is converted into a signal via the optical system 10, the imaging element 11 and the analog front end section 12 and the resulting digital signal is supplied to the camera DSP section 16. The camera DSP section 16 corrects brightness and color in image signal processing.

When the auto photographing function responsive to the smiling face detection is enabled, a shutter release operation is not immediately activated in response to the pressing of the shutter key. Instead, the camera photographing operation starts at the moment the smile level of the subject reaches a predetermined smiling face detection threshold. In accordance with one embodiment of the present invention, the imaging device includes a notification unit for notifying one of the user and the subject of the smile level of the subject displayed on the monitor display 25 and an operation unit for allowing the user to set manually the smiling face detection threshold level serving as the photographing condition. These units will be described in detail later.

The shutter key is pressed or the camera photographing operation is activated in response to the face detection results. The resolution converter 18 then converts the image into an image size matching a photograph mode (step S14). The image codec processor 19 performs the JPEG compression process on the image (step S15). The media controller 22 then records the image onto the recording medium 26 (step S16).

The CPU 29 issues, to the user, feedback, such as flashing an LED on the UI 28 at a timing of JPEG compression process of the captured image converted in image size to be displayed (step S17). The subject can thus know that the smiling face of the subject has caused the photographing operation to be successfully completed.

In step S17, the CPU 29 uses the smiling face detection results obtained in step S12 instead of the image, resolution converted, thus, size converted in step S14. The smiling face detection is performed based on the image resolution converted to be displayed on the monitor display 25 (as one image). The LED lighting process is thus performed without any delay in the photographing operation.

The notification unit for notifying one of the user and the subject of the smile level of the subject displayed on the monitor display 25 and the operation unit for allowing the user to set manually the smiling face detection threshold level serving as the photographing condition are specifically described. It is contemplated that an image recognition engine is mounted in the controller 27 to detect the subjects' faces and the smiling face of any of the subjects. However, for convenience of explanation, these processes are performed by the CPU 29 here.

In response to the supply of the image resolution-converted by the resolution converter 18, the CPU 29 identifies a subject appearing in this image and calculates the smile level thereof. The CPU 29 then produces OSD to display information of the smile level on GUI display and then displays the OSD on the monitor display 25 via the display controller 21.

Figure 6:
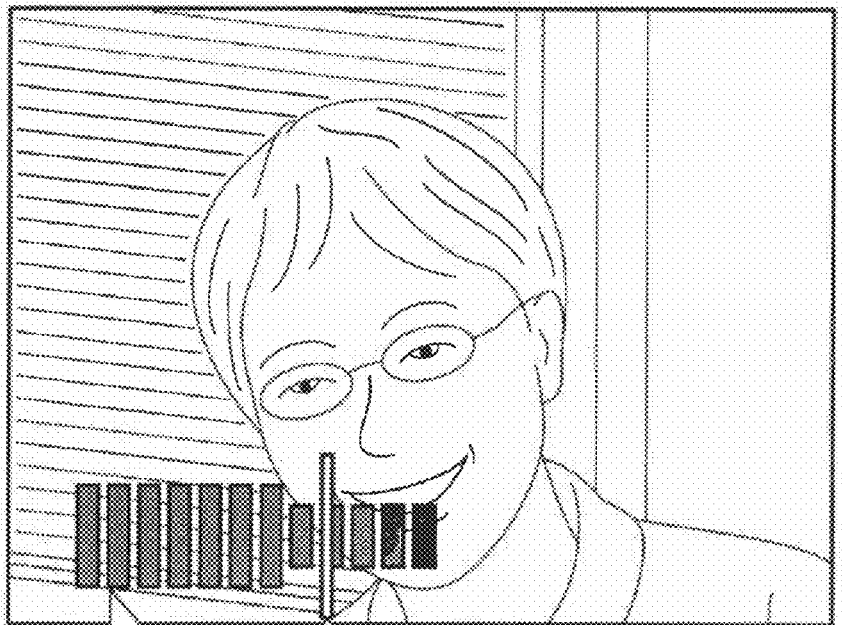
FIG. 6 illustrates a setting screen that displays a smile level of a subject and a smiling face detection threshold level currently set to allow level adjustment thereon.

FIG. 6 illustrates the display of the smile level of the subject and the currently set smiling face detection threshold level and the setting screen for switching such levels. The information of the smile level is displayed as a slider meter on a lower left portion of the screen. The slider meter includes vertical bars arranged in a horizontal direction. The leftmost end bar represents a 0% level and the rightmost end bar represents a 100% level. A portion (A) containing long bars represents a currently detected smile level and a vertically elongated slide bar (B) is movable along a horizontal direction of the slider meter and represents a currently applied smiling face detection threshold level. The smile level of the subject is detected from the image successively input. When the smile level exceeds the smiling face detection threshold level (when the right edge of the smiling face bar of the portion (A) goes beyond the slide bar (B) of the smiling face detection threshold level), a smiling face is detected from the detected face of the subject, i.e., the photographing condition is satisfied.

The slider meter is known in the related art and finds many applications such as a volume control.

The user can modify the smiling face detection threshold level by moving leftward or rightward the slide bar (B) of the smiling face detection threshold level on the slider meter by operating the UI 28. The smiling face detection threshold level may not be sufficient depending on personal difference. For example, an auto photographing operation may be easily triggered even though the subject does not smile, or the auto photographing operation may remain untriggered even though the subject broadly smiles. In such a case, the smiling face detection threshold level is manually adjusted using the slide bar (B).

Figure 7:
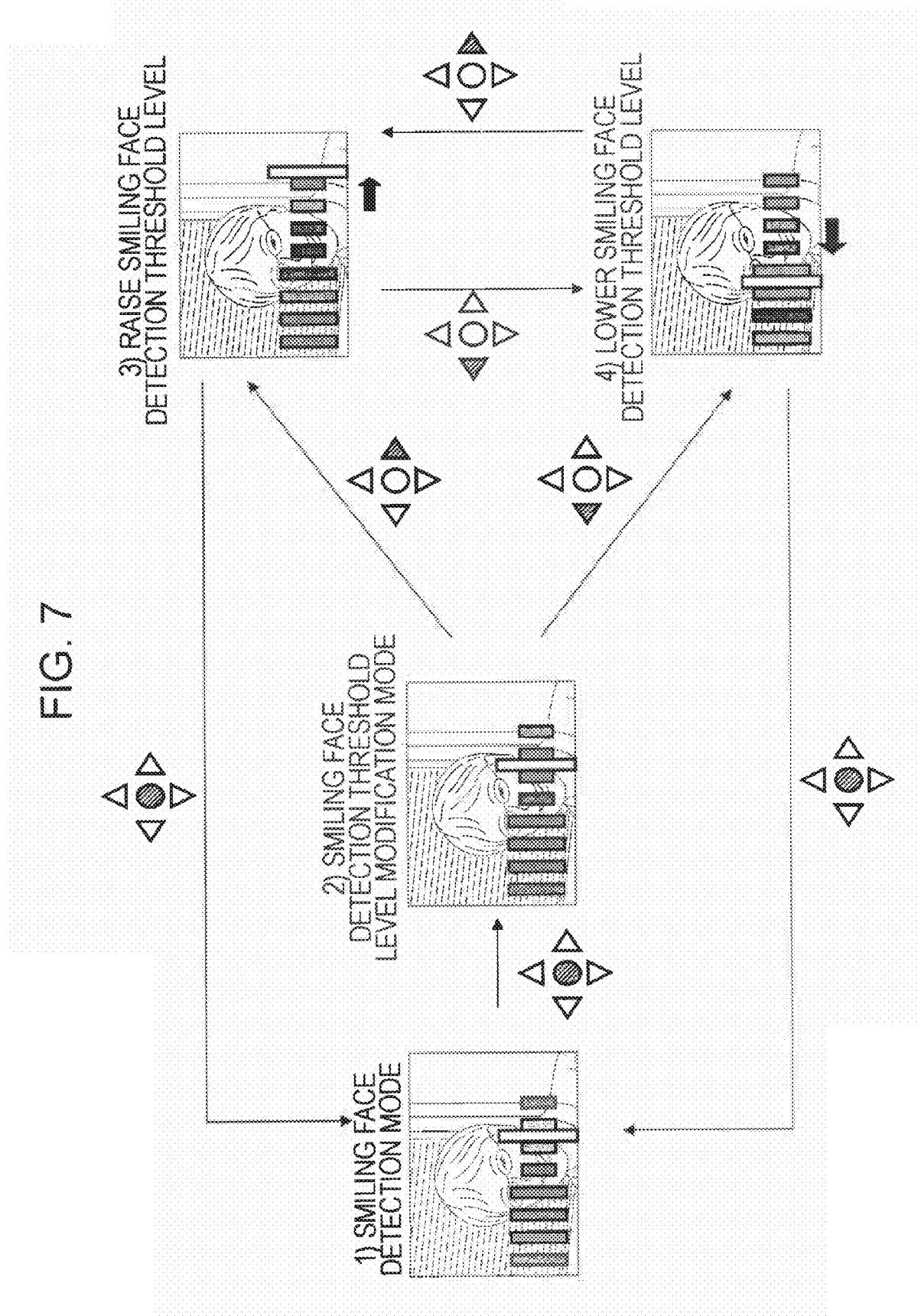
FIG. 7 illustrates screen updating in which the smiling face detection level is set using five operation keys, namely, up, down, left, right and enter keys.

The user operation of the UI 28 to adjust the smiling face detection threshold level on the slider meter is not limited to any particular method. For example, the user may adjust the smiling face detection threshold level using the five operation keys of up, down, left, right and center enter keys. FIG. 7 illustrates such an operation. As shown in FIG. 7, a pressed key is single-hatched.

The digital still camera 1 may be now in a smiling face detection mode. By selecting the enter key, a smiling face detection threshold level modification mode is entered.

In the smiling face detection threshold level modification mode, the smiling face detection threshold level may be raised by selecting the right key. Each time the user selects the right key, the slide bar of the smiling face detection threshold level shifts rightward, and the smiling face detection threshold level is raised.

The smiling face detection threshold level may be lowered by selecting the left key. Each time the user selects the left key, the slide bar of the smiling face detection threshold level shifts leftward, and the smiling face detection threshold level is lowered.

When the setting of the smiling face detection threshold level is complete, the center enter key may be selected to revert back to the initial smiling face detection mode.

The smiling face detection threshold level may be modified in response to a frequency of detection of the smiling face from the detected face of the subject in the input image instead of the user operation on the OSD screen described above.

Figure 8:
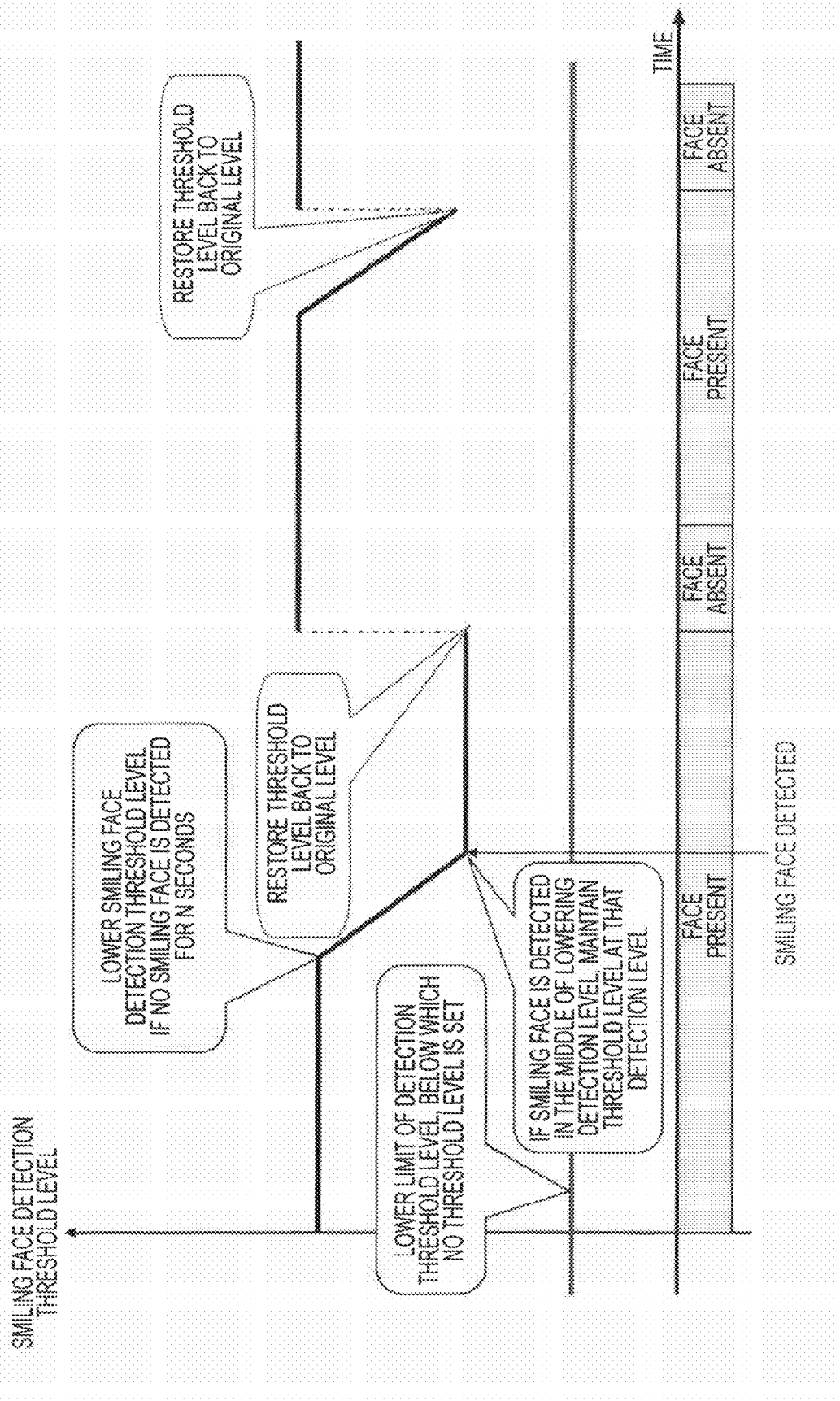
FIG. 8 illustrates auto adjustment of the smiling face detection threshold level.

FIG. 8 is a chart of auto adjustment of the smiling face detection threshold level. The abscissa of the chart represents time and the ordinate represents the smiling face detection threshold level.

The face detection of a subject is continuously performed from the input image. The smiling face detection threshold level is lowered if no smiling face has been detected for N seconds. This process is performed repeatedly for each period. The smiling face detection threshold level is lowered by a predetermined constant every period.

To avoid detecting continuously smiling face, a lower limit is set on the smiling face detection threshold level. The smiling face detection threshold level is repeatedly lowered by the constant value until the lower limit. At the lower limit, the lowering operation is stopped. If a smiling face is detected in the middle of the lowering operation, the lower operation is stopped and the smiling face detection threshold level is maintained there.

If the face image of the subject is detected no longer from the input image, the smiling face detection threshold level is defaulted back to the original value thereof.

The smiling face detection threshold level is thus automatically adjusted in response to the status of the smiling face detection from the input image.

Figure 9:
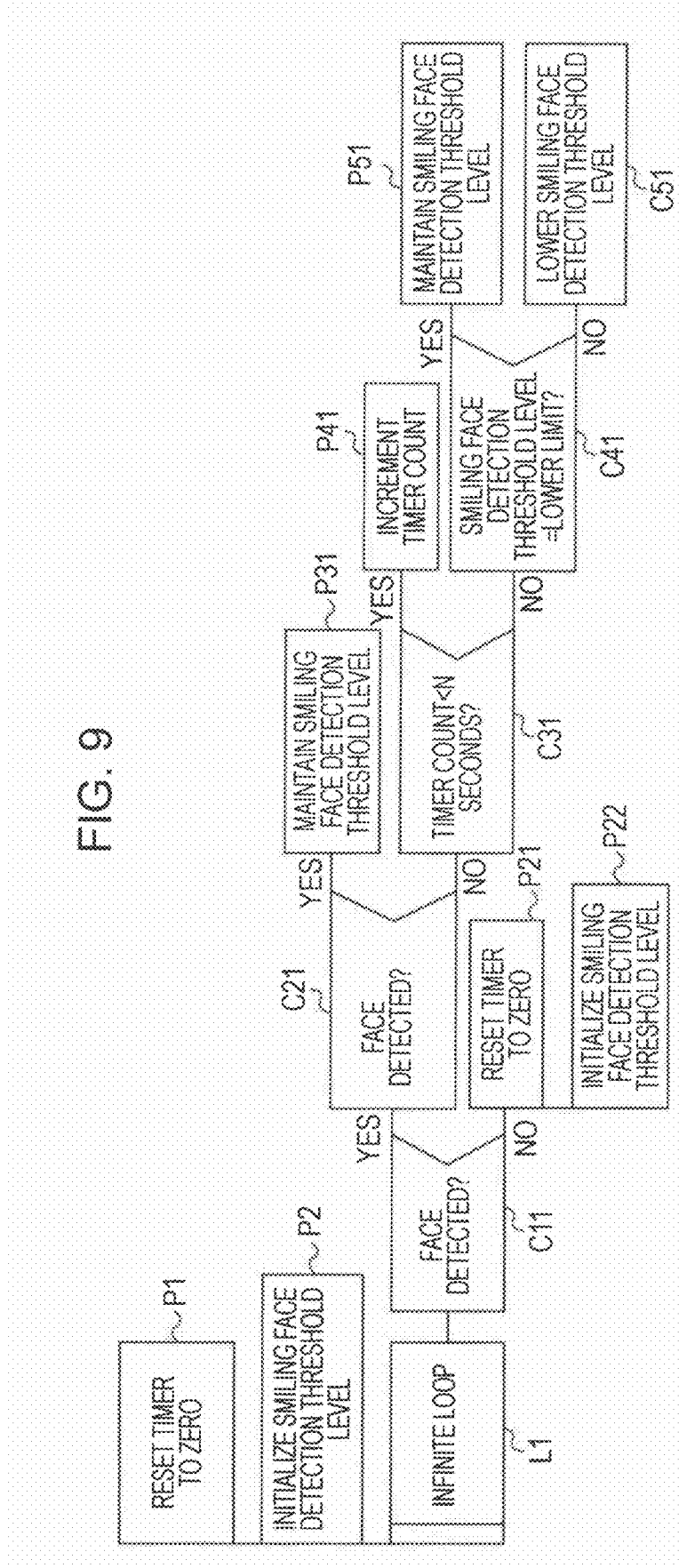
FIG. 9 is a program analysis diagram (PAD) of the auto adjustment of the smiling face detection threshold level.

FIG. 9 is a flowchart illustrating a flow of an automatic adjustment of the smiling face detection threshold level of FIG. 8. FIG. 9 illustrates a flow referred to as a problem analysis diagram (PAD) and thus illustrates an algorithm structure in accordance with a program chart technique different from Japanese Industrial Standards (JIS) flowchart. The algorithm is basically represented by three basic units of continuation, iteration and selection. The PAD is described using the three basic units.

A timer for counting a period for detecting a face of a subject or a smiling face of the subject is set to zero (P1). The smiling face detection threshold level is initialized to a default value (P2). A loop process of L1 is then performed.

In the loop L1, the following process is iterated during a photographing mode.

Face detection is performed from the input image (C11). If a face is detected (YES in C11), it is determined whether a smiling face has been detected from the detected face (C21).

If a smiling face has been detected from the detected face (YES in C21), a current smiling face detection threshold level is maintained (P31).

If no smiling face is detected from the detected face (NO in C21), the timer counts up in P41. When the timer count exceeds N seconds (NO in C31), it is then determined whether the maintained smiling face detection threshold level has reached the lower limit (C41).

If the smiling face detection threshold level has reached the lower limit (YES in C41), the current smiling face detection threshold level is maintained (P51). If the smiling face detection threshold level has not reached the lower limit, the smiling face detection threshold level is lowered (C51).

If it is determined that no face has been detected from the input image (NO in C11), the timer is reset to zero (P21) and the smiling face detection threshold level is initialized (P22).

The imaging device 1 can thus avoid being stuck to a standby state in which the imaging device is ready to detect a smiling face with an angle of view set to a subject but remains still untriggered with no face detected. The imaging device also avoids an easily triggered state in which a smiling face is detected even when a subject does not smile much.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device, comprising:
   image input means for inputting an image of a subject;
   image signal processing means for processing the input image;
   image recording means for recording the input image on a recording medium;
   face presence and smiling degree detection means for detecting a presence of a face of the subject and a smile level of the face of the subject included in the input image processed by the image signal processing means;
   detection threshold level setting means for setting a smiling face detection threshold level at which a determination of whether the subject is smiling is performed based on the smile level detected by the smiling degree detection means; and
   photographing control means for controlling a photographing operation in response to the smiling face detection threshold level being reached by the smile level of the subject detected by the smiling degree detection means, wherein
   the detection threshold level setting means (i) initially sets the smiling face detection threshold level at a default level, (ii) continuously decreases the smiling face detection threshold level after the face is present for a predetermined amount of time and no smiling face is detected for the predetermined amount of time, and (iii) resets the smiling face detection threshold level to the default level after the face presence and smiling degree detection means has detected an absence of the face of the subject.

2. The imaging device according to claim 1, further comprising notification means for notifying a user of information relating to the smile level of the subject detected by the face presence and smiling degree detection means.

3. The imaging device according to claim 2, further comprising display means for displaying the input image processed by the image signal processing means,
   wherein the notification means displays the information relating to the smile level of the subject, detected by the face presence and smiling degree detection means, in an on-screen display fashion on a through image displayed by the display means.

4. The imaging device according to claim 3, wherein the notification means displays in an on-screen display fashion the smiling face detection threshold level, set by the detection threshold level setting means, in combination with the smile level detected by face presence and the smiling degree detection means.

5. The imaging device according to claim 4, wherein the notification means displays the smile level detected by the face presence and smiling degree detection means using a slider meter having a range defined by a 0% level and a 100% level while also displaying with a slide bar on the slider meter the smiling face detection threshold level set by the detection threshold level setting means.

6. The imaging device according to claim 5, further comprising operation means for receiving an instruction input from a user,
   wherein the detection threshold level setting means modifies the smiling face detection threshold level in response to the instruction input from the user, and
   wherein the notification means updates a display position of the slide bar on the slider meter in response to the smiling face detection threshold level set by the detection threshold level setting means.

7. The imaging device according to claim 1, further comprising operation means for receiving an instruction input from a user,
   wherein the detection threshold level setting means modifies the smiling face detection threshold level in response to the instruction input from the user.

8. The imaging device according to claim 1, wherein the detection threshold level setting means automatically adjusts the smiling face detection threshold level in response to the status of detection of a smiling face from the detected face of the subject in the input image.

9. The imaging device according to claim 8, wherein the detection threshold level setting means lowers the smiling face detection threshold level in response to a time elapse for which no smiling face has been detected from the detected face of the subject.

10. The imaging device according to claim 9, wherein the detection threshold level setting means restores the smiling face detection threshold level to an original value thereof when the face of the subject is no longer detected from the input image.

11. The imaging device according to claim 1, further comprising:
    display means for displaying the input image processed by the image signal processing means;
    resolution conversion means for converting the input image processed by the image signal processing means into an image having an image size to be displayed on the display means or having an image size matching a photographing mode; and
    image compression means for compressing the image, resolution converted by the resolution conversion means, in accordance with the photographing mode,
    wherein the image recording means records, on the recording medium, image information into which the image is compressed.

12. The imaging device according to claim 11, wherein the smiling degree detection means detects a smile pattern of the subject based in the image, resolution converted to be displayed on the display means.

13. An imaging method of performing a photographing operation on an input image of a subject, comprising steps of:
    processing the input image;
    detecting a presence of a face of the subject;
    detecting a smile level of the face of the subject included in the processed input image;
    setting a smiling face detection threshold level at a default level at which a determination of whether the subject is smiling is performed based on the detected smile level;
    recording the input image onto a predetermined recording medium in response to the smiling face detection threshold level being reached by the detected smile level of the subject;

continuously decreasing the smiling face detection threshold level after the face is present for a predetermined amount of time, and after no smiling face is detected for the predetermined amount of time; and resetting the smiling face detection threshold level to the default level after an absence of the face of the subject is detected by said step of detecting the presence.

14. The imaging method according to claim 13, further comprising a step of notifying a user of information relating to the detected smile level of the subject.

15. The imaging method according to claim 14, wherein the step of notifying comprises displaying the information relating to the detected smile level of the subject in an on-screen display fashion on a through image processed.

16. The imaging method according to claim 15, wherein the step of notifying comprises displaying the set smiling face detection threshold level in combination with the detected smile level in an on-screen display fashion.

17. The imaging method according to claim 16, wherein the step of notifying comprises displaying the detected smile level using a slider meter having a range defined by a 0% level and a 100% level while also displaying with a slide bar on the slider meter the set smiling face detection threshold level.

18. The imaging method according to claim 17, wherein the step of notifying includes updating a display position of the slide bar on the slider meter in response to an instruction from a user, and wherein the step of setting includes modifying the smiling face detection threshold level in response to a display position of the slide bar on the slider meter.

19. The imaging method according to claim 13, wherein the step of setting comprises modifying the smiling face detection threshold level in response to an instruction input from a user.

20. The imaging method according to claim 13, wherein the step of setting comprises automatically adjusting the smiling face detection threshold level in response to the status of detection of a smiling face from the detected face of the subject in the input image.

21. The imaging method according to claim 20, wherein the step of setting comprises restoring the smiling face detection threshold level to an original value thereof when the face of the subject is no longer detected from the input image.

22. A non-transitory computer-readable storage medium having computer instructions recorded thereon, the computer instructions configured to perform a method of capturing an input image of a subject when executed on a computer, the method comprising the steps of:

processing the input image;

detecting a presence of a face of the subject;

detecting a smile level of the face of the subject included in the processed input image;

setting a smiling face detection threshold level at a default level at which a determination of whether the subject is smiling is performed based on the detected smile level;

recording the input image onto a predetermined recording medium in response to the smiling face detection threshold level being reached by the detected smile level of the subject;

continuously decreasing the smiling face detection threshold level after the face is present for a predetermined amount of time, and after no smiling face is detected for the predetermined amount of time; and resetting the smiling face detection threshold level to the default level after an absence of the face of the subject is detected by said step of detecting the presence.

23. An imaging device, comprising:

an image input unit inputting an image of a subject;

an image signal processing unit processing the input image;

an image recording unit recording the input image on a recording medium;

face presence and a smiling degree detection unit detecting a presence of a face of the subject and a smile level of the face of the subject included in the input image processed by the image signal processing unit;

a detection threshold level setting unit setting a smiling face detection threshold level at which a determination of whether the subject is smiling is performed based on the smile level detected by the smiling degree detection unit; and a photographing control unit controlling a photographing operation in response to the smiling face detection threshold level being reached by the smile level of the subject detected by the smiling degree detection unit, wherein the detection threshold level setting unit (i) initially sets the smiling face detection threshold level at a default level, (ii) continuously decreases the smiling face detection threshold level after the face is present for a predetermined amount of time, and after no smiling face is detected for the predetermined amount of time, and resets the smiling face detection threshold level to the default level after an absence of the face of the subject is detected by the face presence and smiling degree detection unit.

* * * * *